US008066232B2

(12) United States Patent
Wills et al.

(10) Patent No.: US 8,066,232 B2
(45) Date of Patent: Nov. 29, 2011

(54) FLAT-SCREEN MONITOR SUPPORT

(75) Inventors: Andrew Wills, London (GB); Seiyo Ezure, Tokyo (JP); Alex Lau, London (GB)

(73) Assignee: Colebrook Bosson Saunders Products Ltd. (GB)

( * ) Notice: Subject to any disclaimer, the term of this patent is extended or adjusted under 35 U.S.C. 154(b) by 29 days.

(21) Appl. No.: 12/532,258

(22) PCT Filed: Mar. 20, 2008

(86) PCT No.: PCT/EP2008/053413
§ 371 (c)(1),
(2), (4) Date: Jan. 22, 2010

(87) PCT Pub. No.: WO2008/113860
PCT Pub. Date: Sep. 25, 2008

(65) Prior Publication Data
US 2010/0148020 A1    Jun. 17, 2010

(30) Foreign Application Priority Data
Mar. 22, 2007 (GB) .................................. 0705479.4

(51) Int. Cl.
*F16L 3/00* (2006.01)

(52) U.S. Cl. ................. 248/121; 248/229.15; 248/278.1

(58) Field of Classification Search .................. 248/121, 248/125.7, 274.1, 276.1, 278.1, 229.15, 229.25, 248/228.6, 231.71, 218.4, 219.4, 917; 361/679.21
See application file for complete search history.

(56) References Cited

U.S. PATENT DOCUMENTS
3,297,291 A    1/1967    Everett
(Continued)

FOREIGN PATENT DOCUMENTS
CN    2284557 Y    6/1998
(Continued)

OTHER PUBLICATIONS
International Search Report for Internation Application No. PCT/EP2008/053413, completed Jul. 17, 2008; 7 pages.
(Continued)

*Primary Examiner* — Ramon Ramirez
(74) *Attorney, Agent, or Firm* — Carter, DeLuca, Farrell & Schmidt, LLP

(57) ABSTRACT

A flat-screen monitor support comprises a body having means for attachment of a monitor thereto and a locking means operable to lock against a support post extending through the body and through the locking means. The locking means supports the body to prevent the body from sliding down the post under the weight of a monitor attached to the body. The body is rotatable relative to the locking means about an axis of a support post extending through the body and locking means, when the locking mechanism is locked to the support post. In addition, a support base for securing a flat-screen monitor support to a table surface, comprising a support post having a support plate secured to one end thereof, a seat cup to sit on a table surface and receive therein the support plate with the support post upstanding from the table surface, and a clamp bracket to sit on the support plate with a tightening means positionable against an underside of a table surface, to clamp the support plate, seat cup and table top together. Once secured to a table top, the support plate is rotatable relative to the seat cup and the clamp member to enable a user to position a flat-screen monitor relative to the support base.

18 Claims, 9 Drawing Sheets

U.S. PATENT DOCUMENTS

| | | | |
|---|---|---|---|
| 3,997,645 A * | 12/1976 | Dempster | 264/163 |
| 4,577,819 A * | 3/1986 | Bennett | 248/123.11 |
| 5,039,043 A | 8/1991 | Hodge | |
| 5,092,552 A | 3/1992 | Dayton et al. | |
| 5,751,548 A | 5/1998 | Hall et al. | |
| 6,220,556 B1 * | 4/2001 | Sohrt et al. | 248/279.1 |
| 7,510,155 B2 * | 3/2009 | Huang et al. | 248/278.1 |
| 7,546,993 B1 * | 6/2009 | Walker | 248/218.4 |
| 7,766,288 B2 * | 8/2010 | Kim et al. | 248/176.1 |
| 2003/0075653 A1 * | 4/2003 | Li | 248/274.1 |
| 2004/0144903 A1 * | 7/2004 | Cherubini et al. | 248/231.71 |
| 2005/0284991 A1 | 12/2005 | Saez | |
| 2007/0040084 A1 * | 2/2007 | Sturman et al. | 248/280.11 |
| 2008/0029661 A1 * | 2/2008 | Chen | 248/176.1 |
| 2009/0090831 A1 * | 4/2009 | Henning et al. | 248/278.1 |

FOREIGN PATENT DOCUMENTS

| | | |
|---|---|---|
| CN | 2879355 Y | 3/2007 |
| DE | 20 2005 019 110 U1 | 2/2006 |
| EP | 1 139 003 A2 | 10/2001 |
| EP | 1 471 300 A2 | 10/2004 |
| GB | 2 394 505 A | 4/2004 |
| NL | 9100552 | 10/1992 |
| NL | 1 584 857 A2 | 10/2005 |
| WO | WO 2004/051135 A1 | 6/2004 |
| WO | WO 2005/124220 A1 | 12/2005 |

OTHER PUBLICATIONS

Patents Act 1977: Search Report under Section 17 corresponding to Application No. GB 0705479.4, dated Jun. 22, 2007; 1 page.

Patents Act 1977: Further Search Report under Section 17 corresponding to Application No. GB 0705479.4, dated Jun. 13, 2011; 1 page.

Notification of the First Office Action (PCT), corresponding to Application No. 200880018402.3, dated Nov. 12, 2010; 2 pages.

* cited by examiner

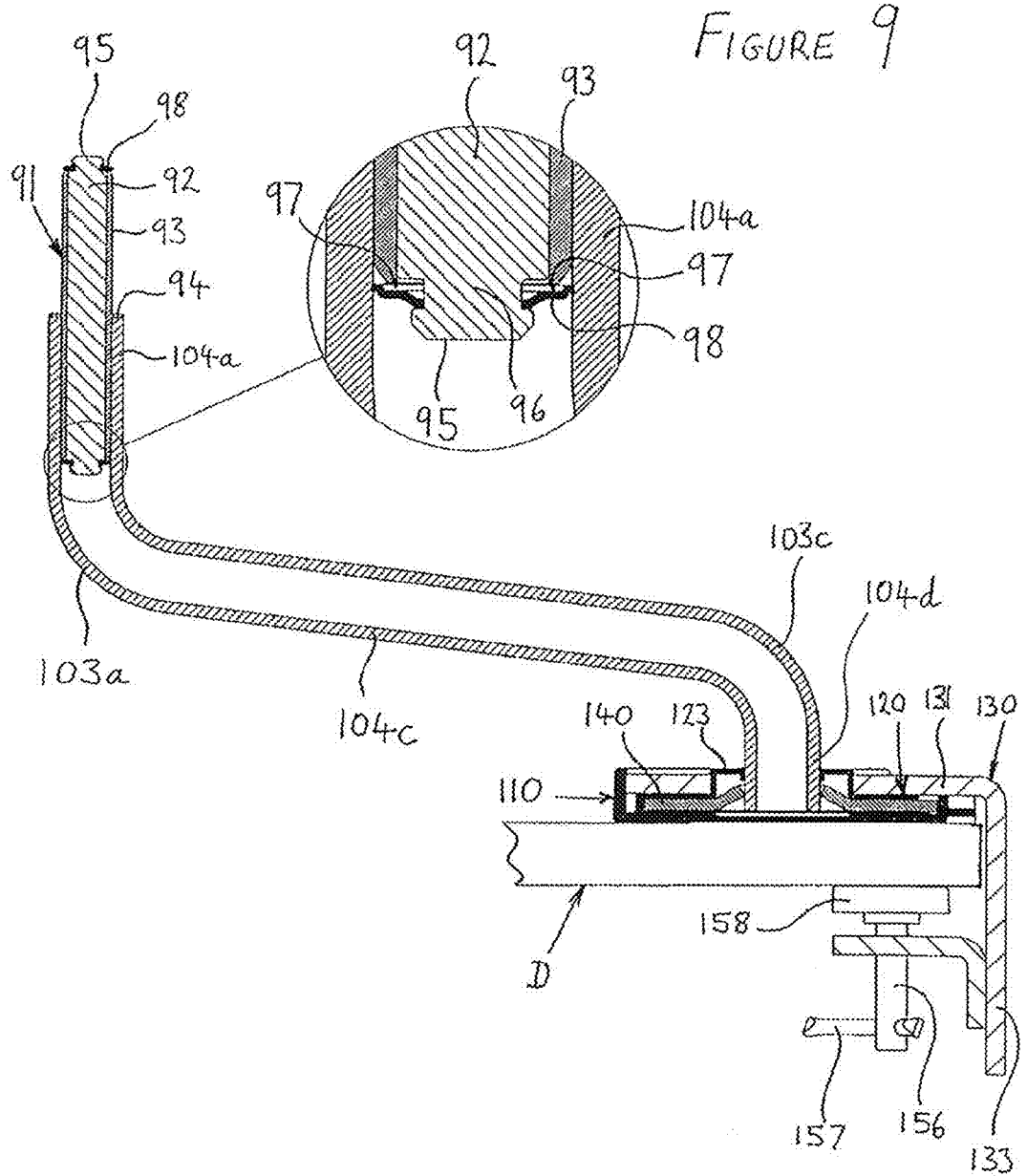

FLAT-SCREEN MONITOR SUPPORT

CROSS-REFERENCE TO RELATED APPLICATIONS

The present application claims the benefit of and priority to International Application No. PCT/EP2008/053413 filed on Mar. 20, 2008 claiming priority from British Patent Application No. 0705479.4 filed on Mar. 22, 2007, the entire contents of each of which are incorporated herein by reference.

The present invention relates to a support for a flat-screen monitor, and more particularly, to an adjustable support for mounting to a post, including a mechanism to prevent the support from sliding down the post under the weight of the monitor. The present invention also relates to a means for mounting the post to a horizontal surface such as a desk top.

Most modern PCs include a Visual Display Unit in the form of a flat-screen monitor, for example, a LCD display. Such flat-screen monitors have the advantage of being slim and light, and therefore can be mounted on elevated support devices such as a support arm, which can be secured to a work surface such as a desk or table so that the flat-screen monitor is suspended above the work surface. This arrangement is also neat and aesthetically attractive.

In order for such a support device to be practical, it must be adjustable so that a user can position the flat-screen monitor in the most appropriate position for use. It is known to mount support arms or other monitor support devices on a vertical support post secured to a desk or table top. However, many such known support devices are not easily adjustable and/or are complicated and expensive to manufacture. In addition, conventional means by which support posts are mounted to a desk or table top can be crude and unattractive. Typically they comprise a clamp with a tube upstanding therefrom into which the support post is received.

Therefore, it is an object of the present invention to provide a support for a flat-screen monitor and a means to secure a support post to a horizontal surface, that substantially alleviates or overcomes the problems mentioned above.

SUMMARY

According to the present invention, there is provided a flat-screen monitor support comprising a body having means for attachment of a monitor thereto and a locking means operable to lock against a support post extending through the body and through the locking means and to support the body to prevent the body from sliding down the post under the weight of a monitor attached to the body, the body being rotatable relative to the locking means about an axis of a support post extending through the body and locking means, when the locking mechanism is locked to the support post.

In a preferred embodiment, the locking means comprises a ring member and the body includes upper and lower support arms which extend either side of the ring member such that, in use, a support post extends through an aperture in the lower support arm, through the ring member and through an aperture in the upper support arm.

The monitor support preferably comprises a bearing sleeve extending through the support arms and ring member and through which, in use, a support post extends.

The locking means preferably comprises an actuator operable to lock or disengage the locking means to/from the support post, the actuator preferably comprising a threaded locking bolt extending through the ring member and operable to exert pressure against the support post extending though the ring member to lock the monitor support thereto.

In a preferred embodiment, the ring member includes a nut secured within the ring member, through which the locking bolt extends as it extends through the ring member and with which it is threadingly engaged in order to allow the locking bolt to be tightened against the support post.

Preferably, the bearing sleeve includes an aperture disposed adjacent the end of the locking bolt in order to allow the end of the locking bolt to directly engage the support post.

The bearing sleeve preferably includes an aperture disposed adjacent the end of the locking bolt and a friction pad disposed in said aperture in order to allow the end of the locking bolt to exert pressure on the friction pad and thereby cause the friction pad to engage the surface of the support post.

The means for attachment of a monitor to the body preferably comprises a mounting plate attached to the body.

The monitor support preferably further comprises a tilting mechanism that allows the mounting plate to pivot relative to the body about a substantially horizontal axis, the tilting mechanism preferably comprising the mounting plate having an arcuate guide member curved about a first, horizontal, axis and slidably secured to the body such that the mounting plate may pivot relative to the body about the first axis, as the arcuate guide member slides relative to the body.

The monitor support preferably comprises at least one guide roller in contact with the arcuate guide member to bias the guide member against a sliding surface of the body, so that as the mounting plate tilts, the arcuate guide member slides between the sliding surface and the at least one guide roller.

The at least one guide roller is preferably mounted on a shaft and is secured to the body by a clamp plate that traps the shaft between it and the body.

The arcuate guide member is preferably curved about a second axis across its width so as to resemble a portion of a surface of a sphere, such that the mounting plate is capable of swivelling relative to the housing about a substantially vertical axis perpendicular to the first axis and the at least one guide roller surface is preferably curved across its width to correspond to the curved surface of the arcuate guide member.

A contact member is preferably disposed within the housing in adjustable frictional contact with the arcuate guide member, operable to lock or allow sliding movement of the arcuate guide member, the contact member preferably including an adjustment mechanism to enable the frictional contact force to be adjusted.

The adjustment mechanism preferably comprises the contact member being received on a threaded post, and a compression spring is disposed on the post such that rotation of the threaded post alters the compression of the spring and thereby alters the force with which the contact member is biased against the arcuate guide member.

The contact member preferably includes a contact face which contacts the arcuate guide member, the contact face being curved to match the curvature of the arcuate guide member.

The present invention also provides a support base for securing a flat-screen monitor support to a table surface, comprising a support post having a support plate secured to one end thereof, a seat cup to sit on a table surface and receive therein the support plate with the support post upstanding from the table surface, and a clamp bracket to sit on the support plate with a tightening means positionable against an underside of a table surface, to clamp the support plate, seat cup and table top together, wherein, once secured to a table top, the support plate is rotatable relative to the seat cup and the clamp member to enable a user to position a flat-screen monitor relative to the support base.

In a preferred embodiment, the support plate and the seat cup include co-operating means which restrict the degree of rotation of the support plate relative to the seat cup.

The co-operating means preferably comprises a protruding segment extending from the outer perimeter of the support plate and a stop formed in the seat cup, such that the protruding segment abuts the stop at a predetermined limit of rotation of the support plate relative to the seat cup.

The clamp bracket preferably comprises a circular clamp portion having a central aperture therethrough, wherein the circular portion is disposed above the support plate, with the support post extending through the central aperture.

The circular clamp portion may act directly on the support plate, or alternatively, a bearing disc may be disposed between the circular clamp portion and the support disc to reduce friction therebetween. The bearing disc preferably comprises a central aperture through which the support post extends, and a raised portion around the central aperture which extends though the central aperture in the circular portion of the clamp bracket.

The tightening means is preferably adjustable to enable the support base to be secured to a range of sizes of table surfaces.

The support post preferably comprises at least two separate components rotatably connected together by a connection means, the connection means preferably comprising a pin having a central spindle and an outer sleeve, which is partially received in cylindrical apertures in two portions of the support post that are to be connected together.

The support post preferably comprises angled arm portions to enable a flat screen monitor supported thereon to be positioned laterally relative to the table top.

DETAILED DESCRIPTION OF THE DRAWINGS

A preferred embodiment of the present invention will now be described, by way of example only, with reference to the accompanying drawings, in which:

FIG. 9 is a cross-sectional view along the line A-A of the apparatus of FIG. 8.

DETAILED DESCRIPTION OF EMBODIMENTS

Figure 1:
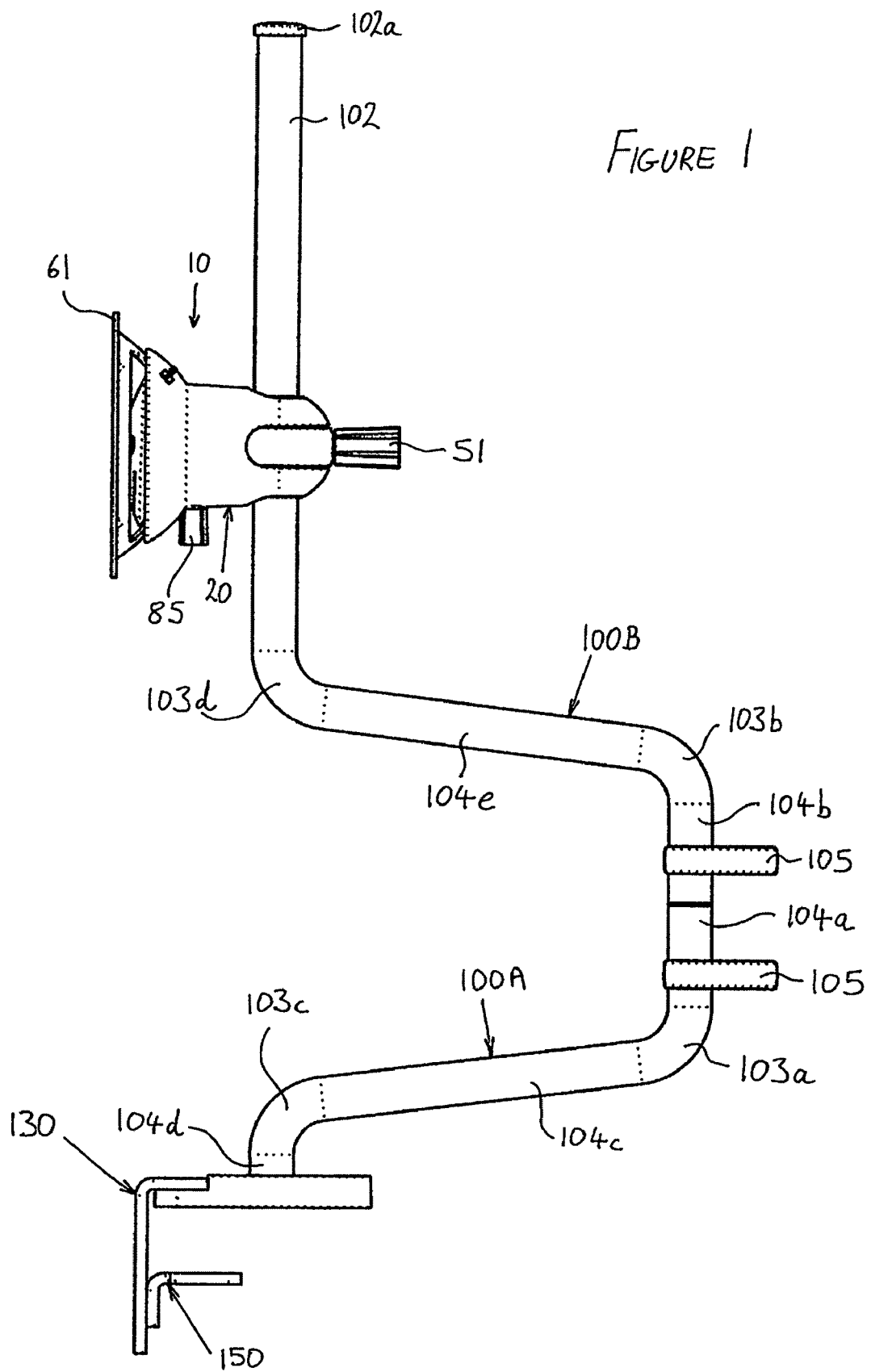
FIG. 1 shows a side view of the apparatus of the present invention showing a flat-screen monitor support with a support post and desk-mounting bracket and support arm.
Figure 2:
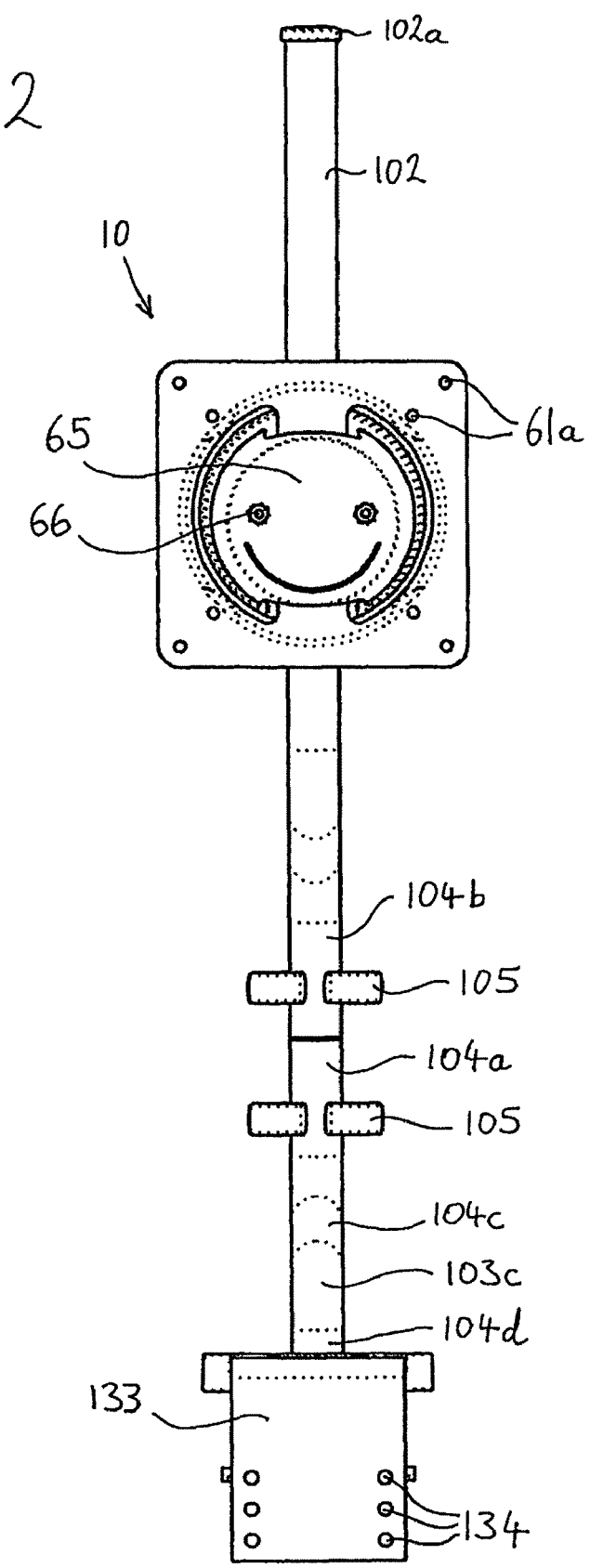
FIG. 2 is a front view of the apparatus shown in FIG. 1.
Figure 3:
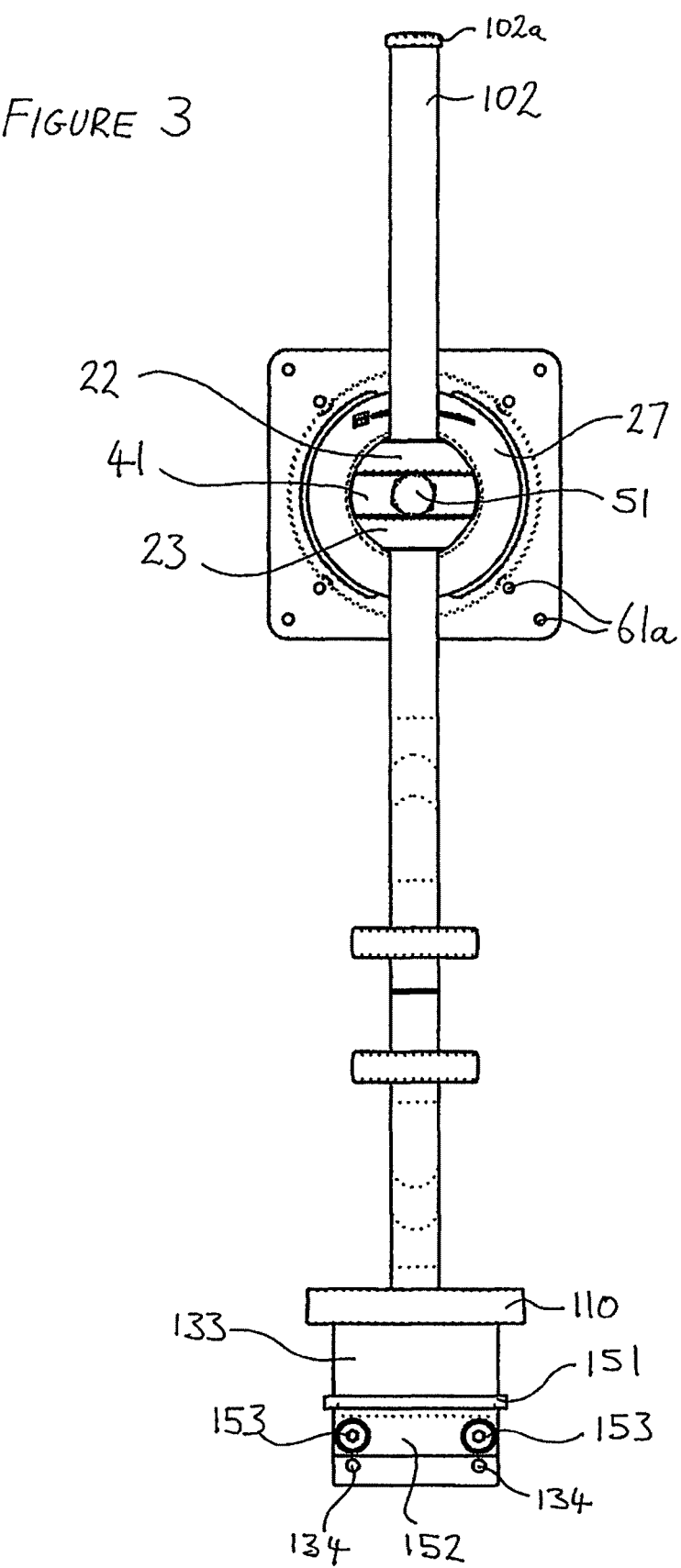
FIG. 3 is a rear view of the apparatus shown in FIGS. 1 and 2.

Referring now to the drawings, there is shown a flat-screen monitor support 10 according to the present invention, comprising a body 20, a locking means 40 at a rear portion of the body 20 and a monitor mounting mechanism 60 at a front portion of the body 20. The body 20 comprises a generally cylindrical housing 21 having an upper support arm 22 and a lower support arm 23 extending horizontally and parallel to each other from the rear portion thereof, which together define a space 24 therebetween. Each support arm 22,23 includes a circular aperture 25, 26 extending therethrough, the apertures 25,26 being coaxial and vertically aligned.

The flat-screen monitor support 10 is designed to be mounted on a vertical support post 102 (described in detail below). The locking means 40 comprises a ring member 41 shaped as a toroid with flattened upper and lower surfaces 41a, 41b and having a central aperture 42 extending threthrough. Three parallel spines 43 protrude inwardly from around the inner surface of the central aperture 42. A bearing sleeve 44 fits inside the central aperture 42, the bearing sleeve 44 having three grooves 45 extending from one end to approximately halfway along the length of the bearing sleeve 44. The grooves 45 are radially disposed about the outer surface of the bearing sleeve 44 to correspond to the positions of the spines 43 on the ring member 41. Therefore, when the bearing sleeve 44 is inserted into the ring member 41, the spines 43 engage with the grooves 45, and the ring member 41 is able to slide over the bearing sleeve 44 until the spines 43 abut the ends of the grooves 45, thereby preventing the ring member 41 from further movement in that sliding direction relative to the bearing sleeve 44. It will be appreciated that the spines 43 engaged in the grooves 45 also prevents the bearing sleeve 44 being able to rotate relative to the ring member 41 about a common axis of the bearing sleeve 44 and ring member 41.

The ring member 41 has square recess 46 formed in the upper surface 41a thereof to form an open cavity therein, and a hole 47 extends from the outer circumference of the ring member 41, through the square recess 46 and is open to the central aperture 42. A notch 48 is formed in the edge wall of the central aperture 42 at the point where the hole 47 emerges. A threaded nut 49 is disposed in the square recess 46 and is dimensioned such that two parallel edges of the nut 49 closely abut the side-walls of the square recess 46, thereby preventing the nut 49 from being able to rotate within the square recess 46. A locking bolt 50 having a ridged handle 51 is disposed through the hole 47, is threadingly engaged with the nut 49 and an end of the locking bolt 50 remote from the handle 51 protrudes into the notch 48.

The bearing sleeve 44 has a cut-out portion 52 positioned at a point opposite the end of the locking bolt 50 when the bearing sleeve 44 is fully inserted into the central aperture 42 in the ring member 41. A friction pad 53 is disposed in the cut-out portion 52 and extends into the notch 48, so as to be contacted by the end of the locking bolt 50 when the locking bolt 50 is threaded through the nut 49 towards the notch 48.

When assembled with the body 20, the ring member 41 fits in the space 24 between the upper and lower support arms 22, 23, with the central aperture 42 of the ring member 41 aligned with the circular apertures 25, 26 in the support arms 22, 23 and the upper and lower flattened surfaces 41a, 41b lying flush against the adjacent lower and upper faces of the upper and lower support arms 22, 23 respectively. The bearing sleeve 44 extends through the circular aperture 26 in the lower support arm 23, through the central aperture 42 in the ring member 41 and through the circular aperture 25 in the upper support arm 22. In use, the support post 102 (described in more detail hereafter) extends though the bearing sleeve 44, and the ring member 41 is secured thereto by using the ridged handle 51 to screw the locking bolt 50 through the nut 49, thereby forcing the friction pad 53 into engagement with the support post 102 and locking the locking means 40 thereto, and thereby supporting the body 20 at the chosen height on the support post 102. However, the body 20 is still able to rotate in a horizontal plane about the axis of, and relative to, the support post 102/ring member 41/bearing sleeve 44, whilst the locking means 40 is locked to the support post 102.

The front portion of the body 20 includes an outwardly tapering mouth portion 27 which is open to a cavity 28 within the body 20. The monitor mounting mechanism 60 comprises a mounting plate 61 having mounting holes 61a formed therein, and an arcuate guide plate 62 secured thereto, the guide plate 62 being arcuate about a horizontal axis X-X (see FIG. 5). The guide plate 62 is rectangular and bent into a curve, and is secured at each distal end proximate top and bottom edges of the mounting plate 61, respectively. (However, the guide plate 62 may alternatively be formed integrally with the mounting plate 61 within the scope of the invention). The guide plate 62 curves away from the mounting plate 61 from each secured end towards its middle.

The monitor mounting mechanism 60 is pivotally attached to the body 20 by means of the arcuate guide plate 62 extending into the cavity 28 and resting against curved guide surfaces 29 formed on the tapering mouth portion 27, proximate upper and lower edges of the cavity 28 of the body 20. The mounting plate 61 is held in position by a pair of roller members 63, rotatably disposed on roller pins 64, with the roller members 63 positioned against the guide plate 62 to hold the guide plate 62 against the curved guide surfaces 29. The roller pins 64 are held in position by a clamp plate 65 which traps the distal ends of each of the roller pins 64 in recesses 30 in the mouth portion 27 of the body 20. The clamp plate 65 is secured to the tapering mouth portion 27 of the body 20 by locking bolts 66 which are threadably engaged with corresponding nuts 67 held within the body 20.

It will be appreciated that once assembled, the mounting plate 61 is able to tilt forwards and backwards generally about the horizontal axis X-X in a direction indicated by arrow A (see FIG. 5), as the guide plate 62 slides over the curved guide surfaces 29, held thereagainst by rolling contact with the roller members 63.

The monitor mounting mechanism 60 further includes a tilt adjustment mechanism 80 to selectively secure the mounting plate 61 at a chosen tilt angle. The tilt adjustment mechanism 80 is disposed within the cavity 28 of the body 20, between and behind the curved guide surfaces 29 and behind the arcuate guide plate 62, and comprises a contact member 81 having a curved contact face 82 which contacts the guide plate 62 on an opposite side thereof to the roller members 63 and which is shaped corresponding to the curve of the arcuate guide plate 62. The contact member 81 is able to move vertically within the cavity 28 of the body 20, but is prevented from moving any further rearwards into the cavity 28 by a retaining wall (not shown) against which the contact member 81 abuts and it slidable vertically relative to.

The contact member 81 has a hollow bore 83 extending vertically therethrough in which a threaded adjustment bolt 84 is received. The hollow bore 83 includes an enlarged hexagonal portion 83a at the upper part of the contact member 81. The adjustment bolt 84 is provided with a ridged handle 85 to facilitate manipulation of the adjustment bolt 84 by a user. The adjustment mechanism 80 further comprises a screw clip 86, upper and lower compression springs 87a, 87b, and a retaining nut 88. When assembled, the adjustment bolt 84 extends from the underside of the cylindrical portion 21 of the body 20 into the cavity 28 through an aperture (not shown) in the underside of the body 20, and then through the spring clip 86, through the lower compression spring 87b, through the hollow bore 83 of the contact member 81, through the upper compression spring 87a and is threadingly engaged with the retaining nut 88, which is held in the hexagonal portion 83a of the hollow bore 83 so that it is unable to rotate therein.

The spring clip 86 engages with a recessed groove 86a in the ridged handle 85, within the cavity 28, to prevent the adjustment bolt 84 from being axially moveable relative to the body 20.

Once assembled, the contact surface 82 of the contact member 81 abuts against the adjacent surface of the guide plate 62, and is prevented from moving away from the guide plate 62 by the retaining wall. The force of the upper compression spring 87a against the retaining nut 88 and the compression member 81 biases the contact member 81 downwards so that the contact surface 82 is pressed against the guide plate 62, with a force greater than an opposite upwards force exerted by the lower compression spring 87b against the spring clip 86 and the contact member 81.

At a position where the retaining nut 88 is located at the distal end of the adjustment bolt 84 remote from the ridged handle 85, the upper compression spring 87a is under little compression and so the contact face 82 of the contact member 81 is only lightly pressed against the guide plate 62. This allows the mounting plate 61 to be tilted relative to the body 20, as the guide plate 62 is able to move relative to the contact member 81 over the guide surfaces 29. However, if a user rotates the adjustment bolt 84 using the ridged handle 85, so that the retaining nut 88 is drawn further down the threaded shaft of the adjustment bolt 84, then the upper compression spring 87a is placed under increased compression and thereby exerts a greater force on the contact member 81, urging the contact surface 82 into contact with the guide plate 62 with increased force. The resulting increased friction between the contact face 82 and the guide plate 62 prevents these two components from moving relative to each other, and so locks the mounting plate 61, and associated flat screen monitor, at a chosen tilt angle relative to the body 20.

The above-described tilt-adjustment mechanism has the advantage that it gives a finer and more progressive frictional force adjustment that would be obtained if the upper compression spring 87a was omitted and the threaded nut 67 acted directly on the contact member 81.

Figure 5:
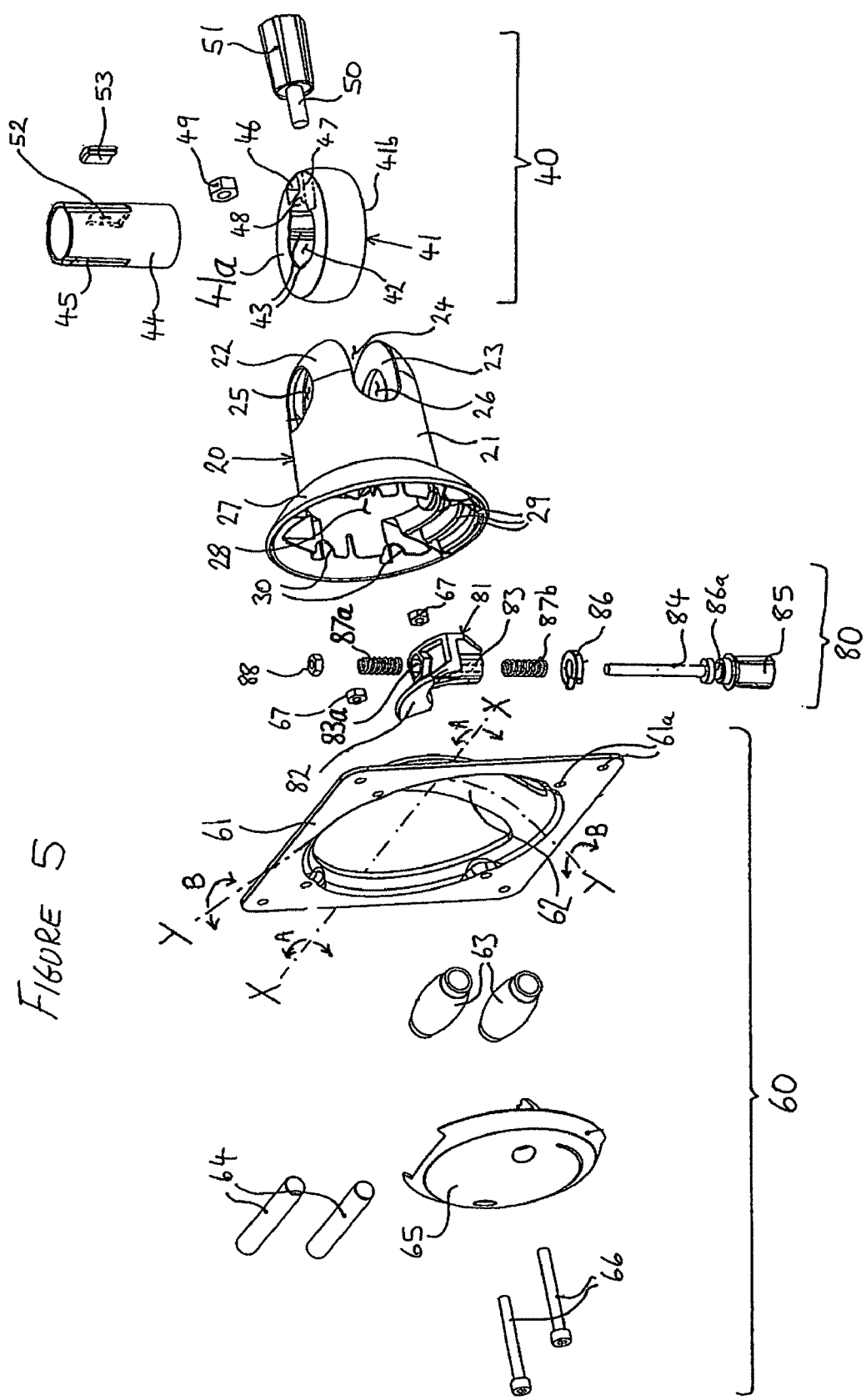
FIG. 5 is an exploded view of the flat screen monitor support of FIGS. 1-4.
Figure 6:
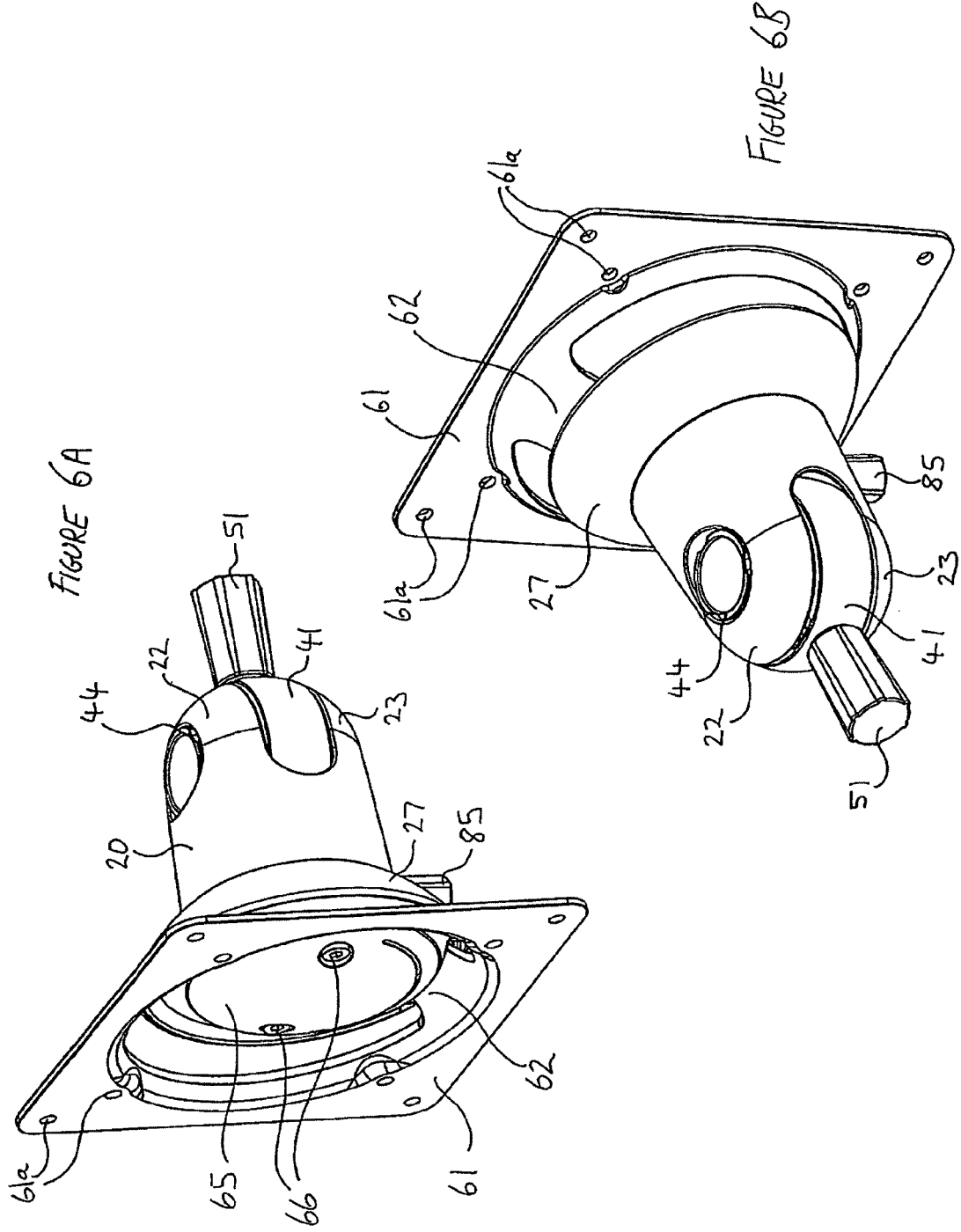
FIGS. 6A and 6B are perspective views of the flat screen monitor support of FIGS. 1-5.

In the preferred embodiment of the invention, the arcuate guide plate 62 is curved about an axis along its length Y-Y (see FIG. 5) as well as along the horizontal axis X-X. This results in the arcuate guide plate 62 being shaped as a section of a spherical surface. In this embodiment, the roller members 65 have a curved surface whereby their diameter at the middle is greater than the diameter at the edges (as shown in FIG. 5) such that they are correspondingly curved to the curve along axis Y-Y of the arcuate guide plate 62, so that they are in contact with the surface of the arcuate guide plate 62 across its width. This allows the mounting plate 61 and associated monitor secured thereto, to be pivoted side-to-side about a vertical axis in a direction shown by arrow B (see FIG. 5) relative to the body 20, as well as being able to be tilted forwards and backwards about axis X-X as described above. Such side-to-side motion is therefore independent of, and does not inhibit, the forwards and backwards tilting action shown by arrow A.

The monitor support 10 is intended for use with a table or desk-mountable support structure 100 (see FIGS. 1-4 and 7-9), which comprises a base portion 101 for attachment to a desk or table ('D') and a vertical support post 102, which are connected together by one or more elbow joints 103 and connecting members 104. The vertical support post 102 and one or more of the elbow joints 103/connecting members 104 may be formed integrally or may be formed separately and connected together by a connection mechanism 90 (see FIGS. 4 and 7-9) described in more detail below.

The connection mechanism 90 includes a pivot pin 91 comprising an inner spindle 92 and an outer sleeve 93. The outer sleeve 93 has a flange 94 extending radially from its outer circumference midway along its length. Each end of the spindle 92 has a head 95 formed on a boss 96 which protrudes in an axial direction of the spindle 92. Each end of the spindle 92 has a retaining washer 97 located around the boss 96 and extending over the end of the sleeve 93, and a spring washer 98 which acts against the underside of each head 95 to bias the retaining washer 97 onto the respective end of the sleeve 93, thereby keeping the sleeve 93 in place on the spindle 92.

The pivot pin 91 shown in the Figures is only used to connect two connecting members 104 together. However, it may also be used to connect elbow joints 103/the vertical support post 102 and/or the connecting members 104 together, within the scope of the invention. The connection mechanism 90 will be described with reference to the arrangement shown in the Figures whereby two vertical connecting members 104 extending from respective elbow joints 103 are connected together. The pivot pin 91 is partially received in a circular cavity in the end of each respective connecting member 104. Referring to FIG. 9, one half of the pivot pin 91 is inserted into a circular cavity in a lower vertical connecting member 104a, which extends upwardly from a lower elbow joint 103a, until the flange 94 abuts the top edge of the lower connecting member 104a. The spring washer 98 is configured to form a friction fit within the inner surface of the cavity to help keep the pivot pin 91 in place.

The end of the pivot pin 91 remaining exposed and upstanding from the lower connecting member 104a is inserted into a circular cavity within an upper vertical connecting member 104b, which extends downwardly from an upper elbow joint 103b. As described above with the lower connecting member 104a, the pivot pin 91 is inserted into the cavity until a bottom edge of the upper connecting member 104b abuts the flange 94 and the spring washer 98 again forms a friction fit within the inner surface of the cavity to help keep the pivot pin 91 in place.

Figure 4:
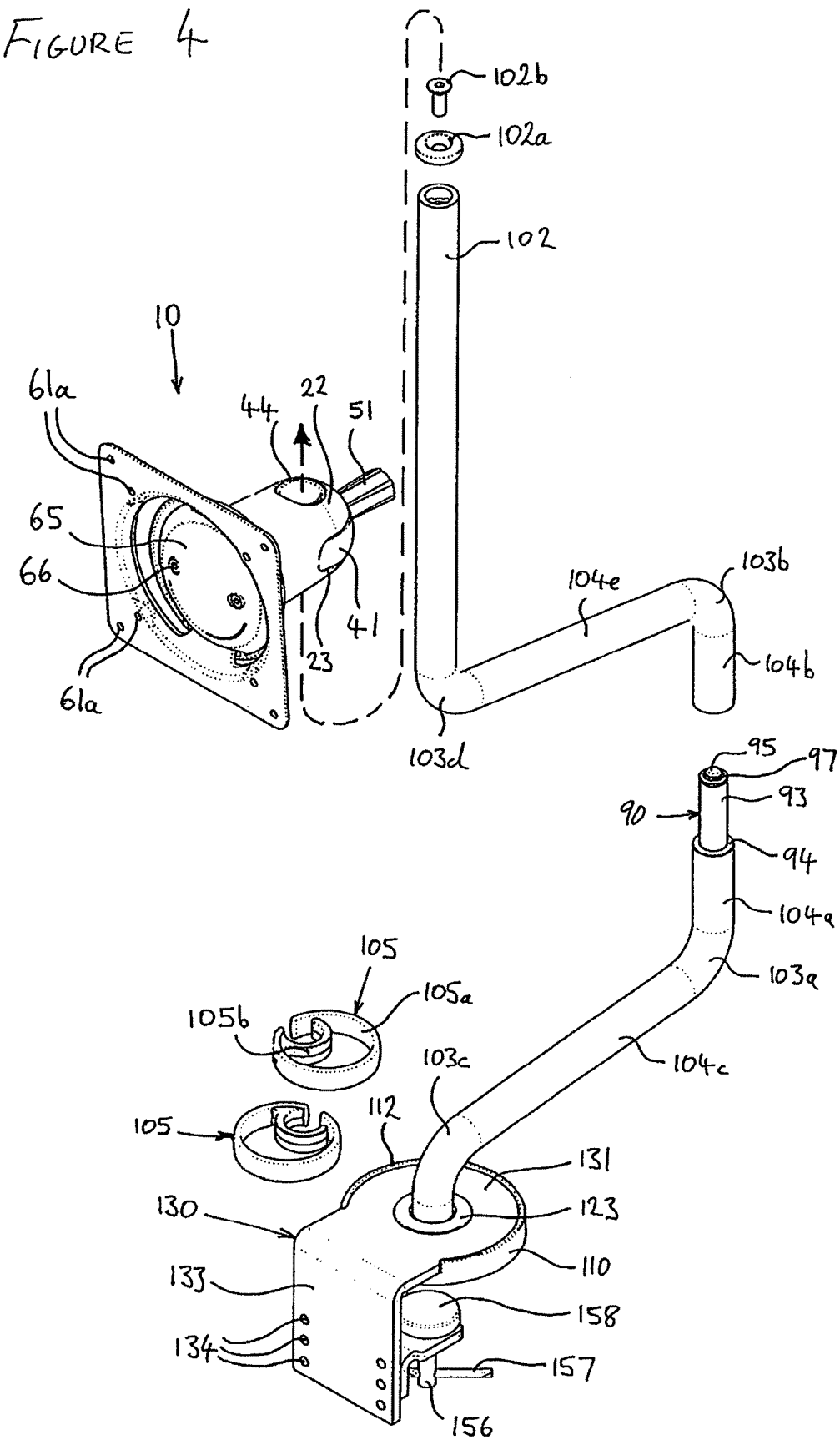
FIG. 4 is an partially exploded view of the apparatus shown in FIGS. 1-3.

Once the upper and lower connecting members 104a, 104b are connected as described above, they are held together by a friction fit that prevents them from easily sliding apart, unless sufficient force is exerted in an axial direction of the pivot pin 91 on each connecting member 104a, 104b to separate them. However, the pivot pin 91 allows the two connecting members 104a, 104b to rotate relative to each other about the axis of the pivot pin 91. With reference to FIG. 4, it will be appreciated that this rotational ability allows the flat screen monitor support 10, and thereby, a flat screen monitor attached thereto, to be positioned in a range of locations in a horizontal plane relative to the base portion 101 secured to the desk or table D.

The support structure shown in FIGS. 1-4 and 7-9 includes a lower arm assembly 100A and an upper arm assembly 100B. The lower arm assembly 100A comprises the lower connecting member 104a, lower elbow joint 103a, a lower lateral connecting member 104c connected at one end to the lower elbow joint 103a and at its other end, to a base elbow joint 103c, and a base connecting member 104d extending vertically downwards from the base elbow joint 103c. The upper arm assembly 100B comprises the vertical support post 102, a support post elbow joint 103d, an upper lateral connecting member 104e, the upper elbow joint 103b and upper connecting member 104b. The support post 102 includes a retaining disc 102a at a distal end thereof remote from the support post elbow joint 103d, which is held in place on the support post 102 by a retaining bolt 102b (see, in particular, FIG. 4). In the illustrated embodiment, the lower and upper arm assemblies 100A, 100B are respectively formed as one integral component. However, the base connecting member 104d, base and lower elbow joints 103c, 103a and lower lateral and lower connecting members 104c, 104a of the lower arm assembly 100A and, the vertical support post 102, support post elbow joint 103d, upper lateral connecting member 104e, upper elbow joint 103b and upper connecting member 104b of the upper arm assembly 100B, may be formed separately and be detachable or permanently connected within the scope of the invention.

Figure 7:
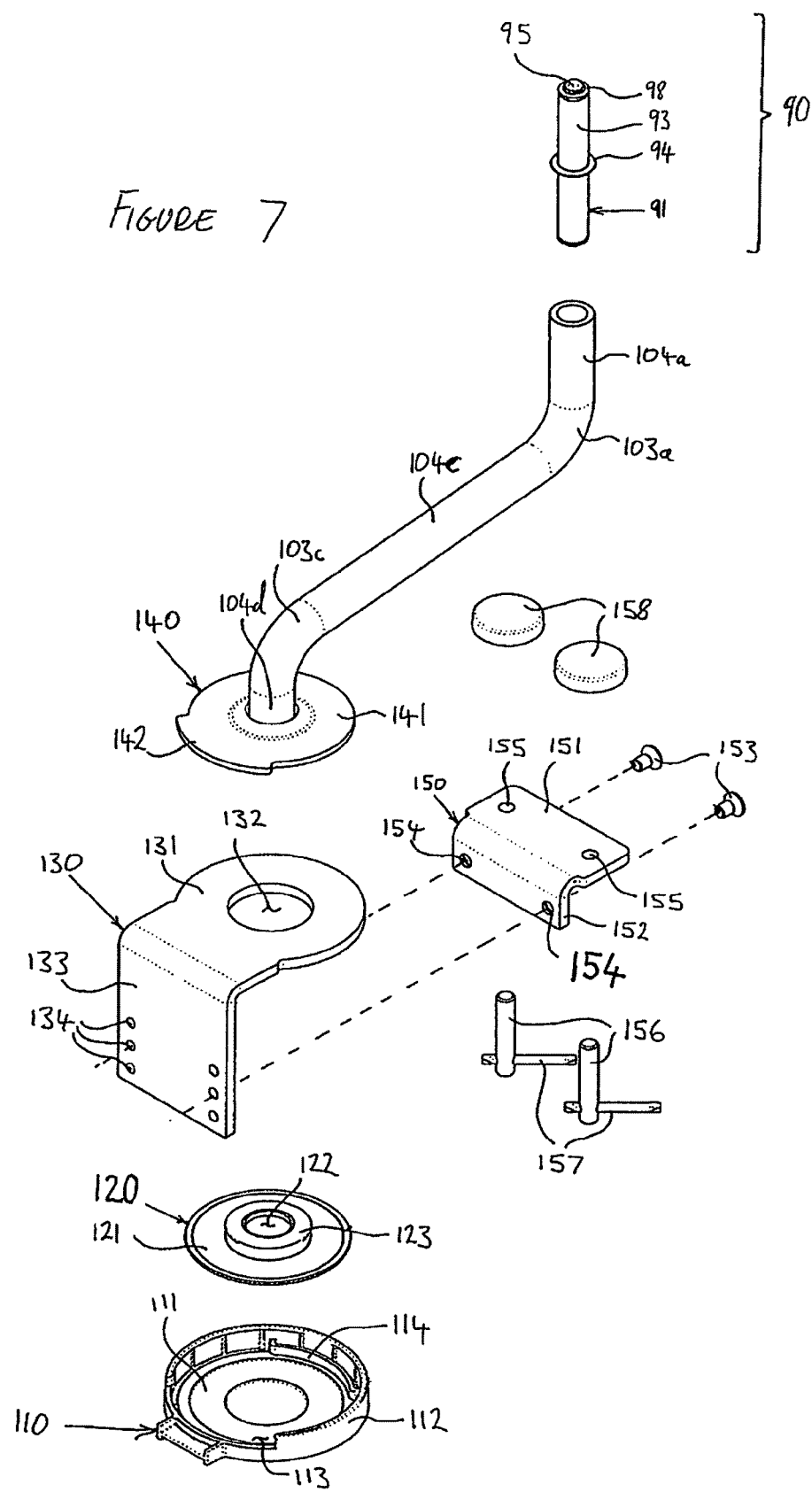
FIG. 7 is an exploded view of the desk-mounting bracket and support arm of FIGS. 1-4.
Figure 8:
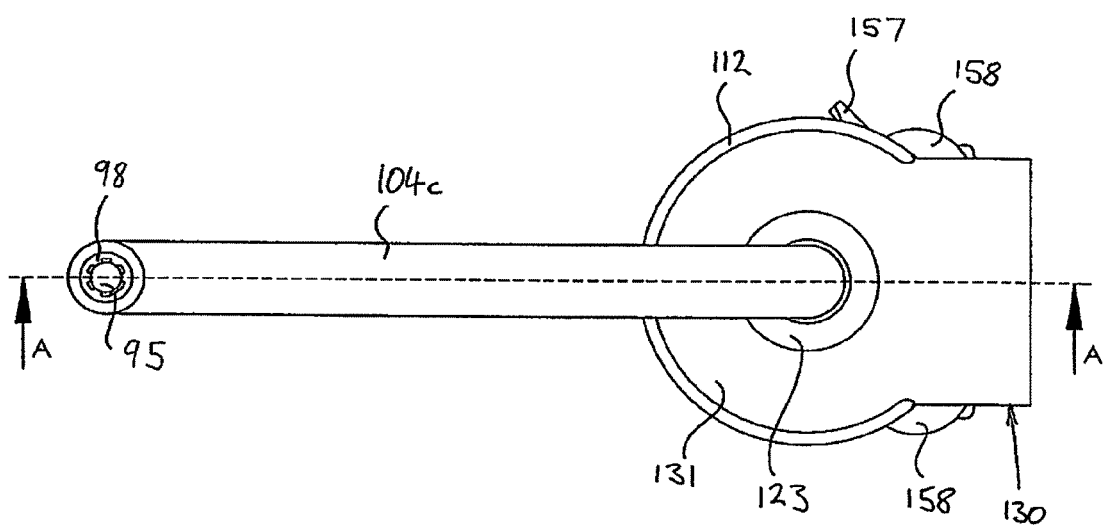
FIG. 8 is a plan view from above of the assembled apparatus of FIG. 7.

Referring now to FIGS. 7-9, the base portion 101 of the support structure 100 will be described in more detail. The base portion 101 comprises a base cup 110, a bearing disc 120, a main bracket 130, and a swivel plate 140 and a lower bracket 150.

The base cup 110 is made of rubber or an equally suitable resilient material, and comprises a flat base 111 with a wall 112 upstanding vertically from the perimeter thereof. The wall 112 extends around approximately three-quarters of the perimeter of the flat base 111, and includes a gap 113 around the remaining one quarter of the perimeter.

A ridge 114 protrudes inwardly from the join of the wall 112 and the flat base 111 towards the centre of the flat base 111, and extends around approximately one quarter of the circumference of the flat base 111. This ridge 114 provides a means to limit rotation of the support structure swivel plate 140 about the base cup 110, as will be described in more detail below.

The bearing disc 120 comprises a flat portion 121 with a central aperture 122, and a circular raised portion 123 at the middle of the flat portion 121 disposed around the central aperture 122. The bearing disc 120 is preferably made of a hard plastic material, and acts to reduce frictional contact between the main bracket 130 and the swivel plate 140.

The main bracket 130 is substantially 'L'-shaped in cross-section and has a first portion 131 formed as a circular plate with a central aperture 132 therethrough, and a second, rectangular portion 133 substantially at right-angles to the first portion 131, and provided with a plurality of threaded apertures 134 formed in two lines proximate the side edges thereof.

The lower bracket 150 is substantially 'L'-shaped in cross-section and comprises a first, horizontal portion 151, and a second, vertical portion 152 perpendicular to the first portion 151. The lower bracket 150 is secured to the main bracket 130 by threaded bolts 153 which extend through holes 154 in the second portion 152 and are threadingly engaged in the threaded apertures 134 of the second portion 133 of the main bracket 130. The first portion 131 of the main bracket 130 and the first portion 151 of the lower bracket are thereby parallel to each other. The first portion 151 of the lower bracket includes two threaded apertures 155 therethrough which receive correspondingly threaded clamp bolts 156. The lower end of each clamp bolt 156 has a handle portion 157 and the opposite end of each clamp bolt 156 has a clamp pad 158 attached thereto. As the second portion 133 of the main bracket 130 includes a plurality of threaded apertures 134, the lower bracket 150 can be secured to the most appropriate ones such that the gap between the first portion 131 of the main bracket 130 and the first portion 151 of the lower bracket 150 is sized to fit the table or desk top D to which the base portion 101 is to be attached.

The end of the base connecting member 104d remote from the base elbow joint 103c is secured to the centre of the swivel plate 140. In the embodiment shown and described, the swivel plate 140 is welded to the base connecting member 104d. However, other means of attachment may be used to secure the swivel disc 140 to the base connecting member 104d within the scope of the invention. The swivel plate 140 is a circular disc 141, which has a segment 142 protruding radially beyond the circumference of the remainder of the disc 141 over approximately one quarter of the perimeter thereof.

The base portion 101 is assembled by passing the lower arm assembly 100A—with the lower connecting member 104a first—through the aperture 122 in the bearing disc 120, then through the aperture 132 in the main bracket 130 until the lower surface of the bearing disc 120 rests against the upper surface of the swivel plate 140, and the upper surface of the bearing disc rests against the underside of the first portion 131 of the main bracket 130, with the circular raised portion 123 of the bearing disc 120 protruding through the aperture 132 in the main bracket 130.

The aperture 122 in the bearing disc 120 is sized to snugly fit around the base connecting member 104d, and the aperture 131 in the main bracket 130 is sized to fit snugly around the circular raised portion 123 of the bearing plate 120, so that lateral play between the three components is substantially eliminated.

To secure this assembly of components to a desk or table top D, the base cup 110 is placed on the upper surface of the table top D, and the main bracket 130, bearing disc 120 and lower arm assembly 100A, including attached swivel plate 140, are positioned so that the swivel plate 140 sits within the base cup 110 with the first portion 151 of the lower bracket 150 extending horizontally underneath the table top D below the first portion 131 of the main bracket 130. The clamp bolts 156 are then tightened using the clamp handles 157 until the clamp pads 158 engage with the underside of the table top D and thereby secure the base portion 101 in position as shown in FIG. 9.

From FIGS. 1, 2, 4 and 9, it can be seen that the first portion 131 of the main bracket 130 extends from the base cup 110 through the gap 113 in the wall 112 so that the top of the first portion 131 of the main bracket 130 is below the level of the wall 112, so that the wall 112 covers the side edges of the first portion 131 and the bearing disc 120. Referring to FIG. 7, the base portion 101 is configured such that rotational movement of the swivel plate 140 relative to the base cup 110 is limited and does not permit 360 degree rotation. The diameter of the swivel plate 140 is such that it fits within the base cup 110 with the ridge 114 abutting the outer perimeter of the swivel disc 140. The lower arm assembly 100A and swivel disc 140 are thereby able to rotate relative to the base cup 110 until the protruding segment 142 rotates round and reaches the ridge 114. At this point, the ridge 114 acts as a stop against which the protruding segment 142 abuts, thereby preventing further rotation of the swivel plate 140 and lower arm assembly 100A relative to the base cup 110 in that direction. It will be appreciated that the length of the ridge 114 and of the protruding segment 142—i.e. the proportion of the circumference of the base cup 110/swivel plate 140 about which they respectively extend—can be specified at the manufacturing stage for a predetermined degree of rotation of the lower arm assembly 100A and associated monitor support 10 and attached monitor, relative to the base cup 110, and therefore, relative to the desk or table top D to which the support structure 100 is secured.

Referring to FIG. 4, the support structure 100 further includes one or more cable clips 105. These are moulded plastic components formed as a large 'C' shape 105a, with a smaller 'c' 105b extending from one end and within the larger 'C' portion 105a. The allows the smaller 'c' portion 105b to snap-fit around the vertical support post 102 or other part of the support structure 100, and wires from the monitor to be tidily bunched together within the larger 'C' portion 105a of the cable clip 105. It will be noted that only one end of the larger 'C' portion 105a is connected to the smaller 'c' portion 105b, to enable wires to be placed within the larger 'C' portion 105a without having to be fed in from a distal end of the wire.

Operation of the above-described monitor support will now be described. A flat-screen monitor (not shown) is secured to the mounting plate 61 using conventional means such as screws (not shown) secured through mounting holes 61a into corresponding screw holes in a rear face of the monitor.

The support structure 100 is assembled and secured to a desk or table top D as described above, leaving the vertical support post 102 upstanding therefrom without the retaining disc 102a on retaining bolt 102b secured threeto. The monitor support 10 with associated monitor is then attached to the support structure 100 by passing the vertical support post 102 through the bearing sleeve 44, and the locking bolt 50 is then tightened using the ridged handle 51 to press the friction pad 53 into engagement with the vertical support post 102 to lock the locking mechanism 40 thereto. This secures the body 20 at a desired height. The retaining disc 102a is then secured to the support post 102 by the retaining bolt 102b. The diameter of the retaining disc 102a is greater than that of the support post 102, the apertures 25,26 in the support arms 22,23 and the inner diameter of the bearing sleeve 44, so that once the retaining disc 102a has been secured in place, the monitor support 10 is unable to be slid off the top of the support post 102.

The user may then adjust the angle of the monitor relative to the locking mechanism 40 by rotating the body 20 about the vertical support post 102. The user may also alter the forwards-backwards tilt angle and the sideways tilt angle of the monitor relative to the body 20 by manipulating the mounting plate 61 relative to the body 20 in the directions shown by arrows A and B, as described above. Once in the chosen position, the user then tightens the tilt adjustment mechanism 80 by rotating the adjustment bolt 84 so that the retaining nut 88 is drawn along the adjustment bolt, thereby increasing the compression of the upper compression spring 87a, and causing the contact member 81 to prevent further movement of the mounting plate 61 relative to the body 20, as described above.

It will be appreciated that the locking mechanism 40 is operable to bind to any location on the post and so there are no discrete spaced apart mounting points or steps which the user must select. The user may therefore position the monitor at any desired location along the length of the post.

However, alternative embodiments of the present invention are intended to fall within the scope of the invention, as defined by the claims hereafter. For example, the vertical support post may have discrete grooves formed therein, and/or the bearing sleeve 44 may omit the friction pad 53 so that the locking bolt 50 acts directly on the vertical support post 102, and may therefore engage in one of the discrete grooves to lock the monitor support at a chosen height on the vertical support post 102.

In the exemplary embodiment described above, the apertures 25, 26, in the support arms 22, 23 of the body 20, and the aperture 42 in the ring member 41 are rounded, to fit a correspondingly round vertical support post 102. However, they may be of alternative shapes within the scope of the invention, for example, oval, square, or rectangular, to fit a correspondingly shaped support post. However, such embodiments would not permit the body 20 to rotate relative to the support post 102 and ring member 41, as in the embodiment shown and described above.

Any suitable material may be used to make the various components described above, for example, metal, such as steel or aluminium, or any suitable plastics material. The base cup 110 may be made of an alternative material to rubber, such as metal or a plastics material. Likewise, the bearing plate 120 may be made of metal, plastic, or any other suitable material.

Although the swivel plate 140 is described as being substantially circular, it may be of an alternative shape within the scope of the invention, for example, of a rectangular shape, or a 'bow-tie' shape, such that the main bracket 130 and base cup 110 are still able secure the support structure 100 and allow rotation, with a limit of rotation provided by the ridge 114, as described above.

It will be appreciated by those skilled in the art that variations may be made to the above exemplary embodiment within the scope of the invention, which is defined in the claims hereafter.

The invention claimed is:

1. A flat-screen monitor support, comprising:
a body having means for attachment of a monitor thereto; and
a locking means operable to lock against a support post extending through the body and through the locking means and to support the body to prevent the body from sliding down the post under the weight of a monitor attached to the body, the body being rotatable relative to the locking means about an axis of a support post extending through the body and locking means, when the locking mechanism is locked to the support post, wherein the locking means comprises a ring member and the body includes upper and lower support arms which extend from either side of the ring member such that, in use, a support post extends through an aperture in the lower support arm, through the ring member and through an aperture in the upper support arm.

2. A monitor support according to claim 1, further comprising a bearing sleeve extending through the support arms and ring member and through which, in use, a support post extends.

3. A monitor support according to claim 2, wherein the locking means comprises an actuator operable to lock or disengage the locking means to/from the support post.

4. A monitor support according to claim 3, wherein the actuator comprises a threaded locking bolt extending through the ring member and operable to exert pressure against the support post extending though the ring member to lock the monitor support thereto.

5. A monitor support according to claim 4, wherein the ring member includes a nut secured within the ring member, through which the locking bolt extends as it extends through the ring member and with which it is threadingly engaged in order to allow the locking bolt to be tightened against the support post.

6. A monitor support according to claim 5, wherein the bearing sleeve includes an aperture disposed adjacent the end of the locking bolt in order to allow the end of the locking bolt to directly engage the support post.

7. A monitor support according to claim 5, wherein the bearing sleeve includes an aperture disposed adjacent the end of the locking bolt and a friction pad disposed in said aperture in order to allow the end of the locking bolt to exert pressure on the friction pad and thereby cause the friction pad to engage the surface of the support post.

8. A monitor support according to claim 1, the means for attachment of a monitor to the body comprises a mounting plate attached to the body.

9. A monitor support according to claim 8, further comprising a tilting mechanism that allows the mounting plate to pivot relative to the body about a substantially horizontal axis.

10. A monitor support according to claim 9, wherein the tilting mechanism comprises the mounting plate having an arcuate guide member curved about a first, horizontal, axis and slidably secured to the body such that the mounting plate may pivot relative to the body about the first axis, as the arcuate guide member slides relative to the body.

11. A monitor support according to claim 10, further comprising at least one guide roller in contact with the arcuate guide member to bias the guide member against a sliding surface of the body, so that as the mounting plate tilts, the arcuate guide member slides between the sliding surface and the at least one guide roller.

12. A monitor support according to claim 11, wherein the at least one guide roller is mounted on a shaft and is secured to the body by a clamp plate that traps the shaft between it and the body.

13. A monitor support according to claim 10 wherein the arcuate guide member is curved about a second axis across its width so as to resemble a portion of a surface of a sphere, such that the mounting plate is capable of swivelling relative to the housing about a substantially vertical axis perpendicular to the first axis.

14. A monitor support according to claim 13, wherein the at least one guide roller surface is curved across its width to correspond to the curved surface of the arcuate guide member.

15. A monitor support according to claim 10, wherein a contact member is disposed within the housing in adjustable frictional contact with the arcuate guide member, operable to lock or allow sliding movement of the arcuate guide member.

16. A monitor support according to claim 15, wherein the contact member includes an adjustment mechanism to enable the frictional contact force to be adjusted.

17. A monitor support according to claim 16, wherein the adjustment mechanism comprises the contact member being received on a threaded post, and a compression spring is disposed on the post such that rotation of the threaded post alters the compression of the spring and thereby alters the force with which the contact member is biased against the arcuate guide member.

18. A monitor support according to claim 17, wherein the contact member includes a contact face which contacts the arcuate guide member, the contact face being curved to match the curvature of the arcuate guide member.

* * * * *